(12) United States Patent
Robotham et al.

(10) Patent No.: US 7,477,650 B2
(45) Date of Patent: Jan. 13, 2009

(54) METHOD AND APPARATUS FOR FRAME-AWARE AND PIPELINED HIERARCHICAL SCHEDULING (75) Inventors: Robert Elliott Robotham, Ottawa (CA); Jordan Lu, Kanata (CA)

(73) Assignee: Alcatel Lucent, Paris (FR)

( * ) Notice: Subject to any disclaimer, the term of this patent is extended or adjusted under 35 U.S.C. 154(b) by 941 days.

(21) Appl. No.: 10/677,413

(22) Filed: Oct. 2, 2003

(65) Prior Publication Data
US 2005/0074011 A1    Apr. 7, 2005

(51) Int. Cl.
*H04L 12/28* (2006.01)
*H04L 12/56* (2006.01)

(52) U.S. Cl. .................. 370/412; 370/416; 370/468

(58) Field of Classification Search .......... 370/412, 370/468, 416, 395.4–395.43
See application file for complete search history.

(56) References Cited

U.S. PATENT DOCUMENTS 6,577,635 B2 *  6/2003  Narayana et al. ....... 370/395.42
6,747,971 B1    6/2004  Hughes et al.
6,771,596 B1    8/2004  Angle et al.
7,007,021 B1 *  2/2006  Nadj et al. ................ 707/7
7,058,751 B2    6/2006  Kawarai et al.
2001/0001608 A1 *  5/2001  Parruck et al. .......... 370/232
2003/0103514 A1 *  6/2003  Nam et al. ............... 370/412
2004/0062261 A1    4/2004  Zecharia et al.
2004/0081108 A1    4/2004  Kloth et al.
2004/0246977 A1   12/2004  Dove et al.

* cited by examiner

*Primary Examiner*—Hong Sol Cho (57) ABSTRACT

A method and apparatus for frame-aware and pipelined hierarchical scheduling is described. In accordance with at least one embodiment of the invention, some or all schedulers of a communication node are associated with one or more storage devices that maintain values used by corresponding higher level schedulers to make scheduling decisions. Because of the nature of the scheduling decision flow and the potential to update registers in real-time, the scheduling arrangement can respond almost immediately to changes occurring at the input queues, which allows scheduling to be responsive to differing priorities of incoming cells. The nature of the scheduling decision flow also allows pipelined scheduling, in which scheduling of one or more additional cells can begin before scheduling of a first cell is completed.

15 Claims, 5 Drawing Sheets

```
┌─────────────────────────────────────────────────────────────┐
│ INITIATING A SCHEDULING DECISION SET FOR A PARTICULAR TIME  │
│ INTERVAL BY SELECTING, AT A FIRST TRAFFIC SCHEDULER IN A FIRST│
│ LEVEL OF TRAFFIC SCHEDULERS, A SECOND TRAFFIC SCHEDULER     │
│ FROM A NEXT LOWER LEVEL                                     │
│                                                         501 │
│  ┌────────────────────────────────────────────────────────┐ │
│  │ SELECTING, AT A THIRD TRAFFIC SCHEDULER IN A NEXT HIGHER│ │
│  │ LEVEL, THE FIRST TRAFFIC SCHEDULER                     │ │
│  │                                                    502 │ │
│  └────────────────────────────────────────────────────────┘ │
│  ┌────────────────────────────────────────────────────────┐ │
│  │ SELECTING THE FIRST TRAFFIC SCHEDULER WHICH            │ │
│  │ CORRESPONDS TO SELECTING A PORT OF THE COMMUNICATIONS  │ │
│  │ MODE                                               503 │ │
│  └────────────────────────────────────────────────────────┘ │
│  ┌────────────────────────────────────────────────────────┐ │
│  │ WHEREIN THE PARTICULAR TIME INTERVAL HAS THE DURATION  │ │
│  │ CORRESPONDING TO AN AMOUNT OF TIME TAKEN BY THE        │ │
│  │ COMMUNICATIONS NODE TO SWITCH AN ATM CELL      504     │ │
│  └────────────────────────────────────────────────────────┘ │
└─────────────────────────────────────────────────────────────┘
                              │
                              ▼
┌─────────────────────────────────────────────────────────────┐
│ COMPLETING THE SCHEDULING DECISION SET FOR THE PARTICULAR   │
│ TIME INTERVAL BY SELECTING, AT THE SECOND TRAFFIC SCHEDULER,│
│ A QUEUE FROM WHICH A NEXT UNIT OF TRAFFIC WILL BE SCHEDULED │
│                                                         505 │
│  ┌────────────────────────────────────────────────────────┐ │
│  │ SELECTING THE SECOND TRAFFIC SCHEDULER CORRESPONDS TO  │ │
│  │ SELECTING A CLASS OF TRAFFIC SERVICED BY THE           │ │
│  │ COMMUNICATIONS NODE                                506 │ │
│  └────────────────────────────────────────────────────────┘ │
└─────────────────────────────────────────────────────────────┘
```

FIG. 5

METHOD AND APPARATUS FOR FRAME-AWARE AND PIPELINED HIERARCHICAL SCHEDULING

BACKGROUND OF THE INVENTION (1) Field of the Invention

The invention relates to the scheduling of traffic in a switch/router. More particularly, the invention relates to supporting increases in switch/router port speeds, providing improved performance in servicing traffic flows of multiple priorities, and providing frame-aware scheduling.

(2) Description of the Related Art

Communication networks typically use devices for directing the flow of data through them. Such devices are often characterized as switches and routers, which may be referred to collectively as switches/routers. A switch/router receiving data at a plurality of inputs often needs to schedule the processing of such data so as to produce one or more output streams that conform to particular criteria. However, switches/routers often exhibit deficiencies that prevent them from maintaining conformance with some of the particular criteria that may be desired.

Figure 1:
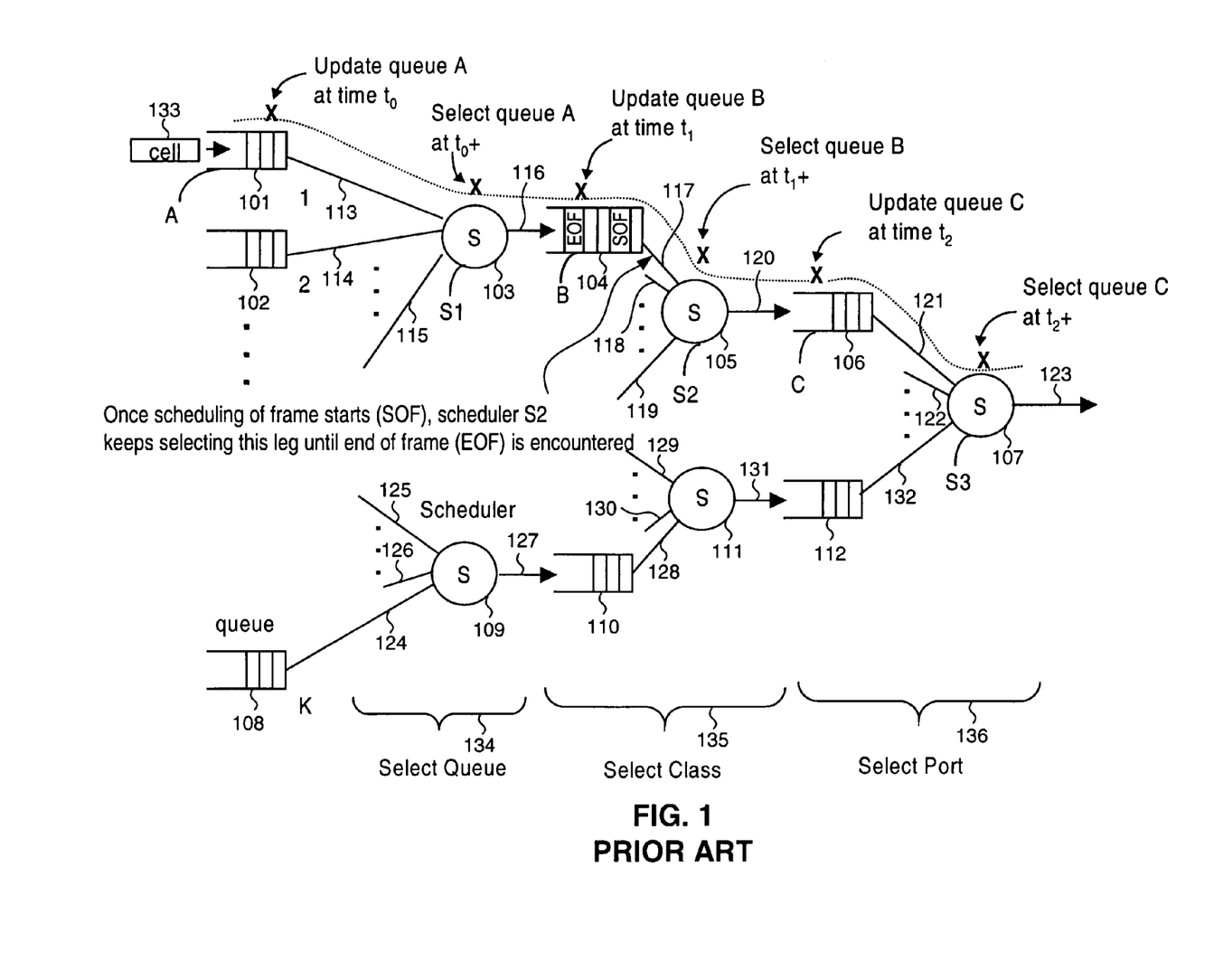
FIG. 1 is a block diagram illustrating a prior art scheduling technique.

FIG. 1 is a block diagram illustrating a prior art scheduling technique. The technique includes input queues 101 and 102 coupled to scheduler 103 via connections 113 and 114, respectively. Additional input queues maybe coupled to scheduler 103 via connection 115. Scheduler 103 provides an output 116 to input queue 104. Input queue 104 is coupled to scheduler 105 via connection 117. Additional input queues may be coupled to scheduler via connection 118 and/or 119. Scheduler 105 provides an output 120 to input queue 106. Input queue 106 is coupled to scheduler 107 via connection 121. Input queue 108 is coupled to scheduler 109 via connection 124. Additional input queues may be coupled to scheduler 109 via connection 125 and/or 126. Scheduler 109 provides output 127 to input queue 110. Input queue 110 is coupled to scheduler 111 via connection 128. Additional input queue may be coupled to scheduler 111 via connection 129 and/or 130. Scheduler 111 provides output 131 to input queue 112. Input queue 112 is coupled to scheduler 107 via connection 132. Additional input queues may be coupled to scheduler 107 via connection 122. Scheduler 107 provides output 123.

As an example, cell 133 is provided to input queue 101. The structure of this system may be considered hierarchical, with cells, such as cell 133 being provided to input queues, such as 101, 102, and 108. At the next level of the hierarchy, referred to as select queue 134, a first level of scheduler, such as scheduler 103 and 109, process the output of the first level of input queues, which includes input queues 101, 102, and 108. From the level of select queue 134, the hierarchy continues to a level of select class 135, which includes input queues 104 and 110, as well as schedulers 105 and 111. From select class 135, the system proceeds to a level for select port 136. The level select port 136 includes input queues 106 and 112, as well as scheduler 107.

The prior art technique illustrated in FIG. 1 comprises a plurality (K) of input queues coupled at their outputs to a hierarchical arrangement of schedulers, the schedulers being arranged in levels with inter-level queues between the schedulers and each inter-level queue coupled to a corresponding scheduler output. Each level of schedulers corresponds to a particular scheduling function, for example, selecting a port, selecting a traffic class, and selecting an input queue.

For example, in operation input queue A is serviced by queue-selection level scheduler 103. Scheduler 103 outputs cells to inter-level queue 104, which is serviced by class-selection level scheduler 105. Scheduler 105 outputs cells to inter-level queue 106. Inter-level queue 106 is serviced by port-selection scheduler 107, which outputs cells to an output port, or switching fabric, of the switch/router.

Frame-aware scheduling is performed to ensure that all cells of a frame are transmitted from a port in a continuous stream, without interruption by other cells. This type of scheduling is used for packet over SONET (POS) transmission, for example. To provide frame-aware scheduling, once scheduling on a frame starts the scheduler must continue to select cells from the frame until an end of frame indication is reached. A start of frame (SOF) indication and an end of frame (EOF) indication are used to delimit the frame. The cells of a frame are eligible for transmission when the entire frame has been received as indicated by the EOF. The cells of a frame can be treated for purposes of scheduling to have arrived when the EOF is received.

However, a problem exists with the aforementioned prior art technique in that the arrival order of data can take precedence over priority assigned to individual units of data. This is because once data has been moved to an inter-level queue by the corresponding scheduler, it is not possible for any data to be placed in the inter-level queue ahead of that data. This means that a newly arrived frame having a priority higher than that of the frame(s) in the inter-level queue must wait until the entire queue contents ahead of it are serviced before it can be serviced. Although this problem exists in scheduler arrangements of this form that are not frame-aware, the problem is exacerbated with frame-aware scheduling because frames can contain a very large number of cells.

Another aspect of the scheduler arrangement illustrated in FIG. 1 involves the timing of the propagation of cells through the scheduler. A cell arrives at input queue 101 resulting in input queue 101 being updated at time t0. At time t0+ (i.e., t0 plus some small delta that is less than a cell time) scheduler 103 selects input queue 101 and forwards the cell to inter-level queue 104. Note that, in practice, cell pointers are manipulated from queue to queue instead of actual cells. Inter-level queue 104 is updated at the next cell time slot, time t1. At time t1+, scheduler 105 selects inter-level queue 104 and forwards the cell to inter-level queue 106. Inter-level queue 106 is updated at the next cell time slot, time t2. At time t2+, scheduler 107 selects inter-level queue 106 and forwards the cell to the switching fabric, or output port.

In general, with this type of arrangement, the time taken for a cell to effectively propagate through the scheduler increases linearly with the number of levels in the scheduling hierarchy, i.e., propagation time=N×cell time (or N×cell period). In the example, since there are three levels of hierarchy it takes three cell time slots for cells to propagate through the arrangement of schedulers.

There are two main problems with the aforementioned prior art technique. Firstly, adding more levels to the scheduling hierarchy, e.g., to support more segregation of traffic into sub-classes, aggregates, multiple services etc, linearly increases the time taken for cells to propagate through the scheduling arrangements. This is undesirable because it delays the response of the switch/router to conditions at its inputs, which adversely affects its performance. Secondly, arrival order of cells can take precedence over priority assigned to cells. This problem occurs because scheduling selections made at each level are made only on the basis of cells that have been forwarded from the previous level to the inter-level queues between the levels. For example, referring to FIG. 1, scheduler 107 cannot respond to a high priority cell arriving at input queue A until the cell has been propagated to the inter-level queue 106. This condition is undesirable because it adversely affects the intended control of traffic on an assigned priority basis. Thus, a solution is needed that avoids the disadvantages of the prior art technique described above.

BRIEF DESCRIPTION OF THE SEVERAL VIEWS OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

A method and apparatus for frame-aware and pipelined hierarchical scheduling is described. In accordance with at least one embodiment of the invention, some or all schedulers of a communication node are associated with one or more storage devices that maintain values used by corresponding higher level schedulers to make scheduling decisions. Because of the nature of the scheduling decision flow and the potential to update registers in real-time, the scheduling arrangement can respond almost immediately to changes occurring at the input queues, which allows scheduling to be responsive to differing priorities of incoming cells. The nature of the scheduling decision flow also allows pipelined scheduling, in which scheduling of a one or more additional cells can begin before scheduling of a first cell is completed.

Figure 2:
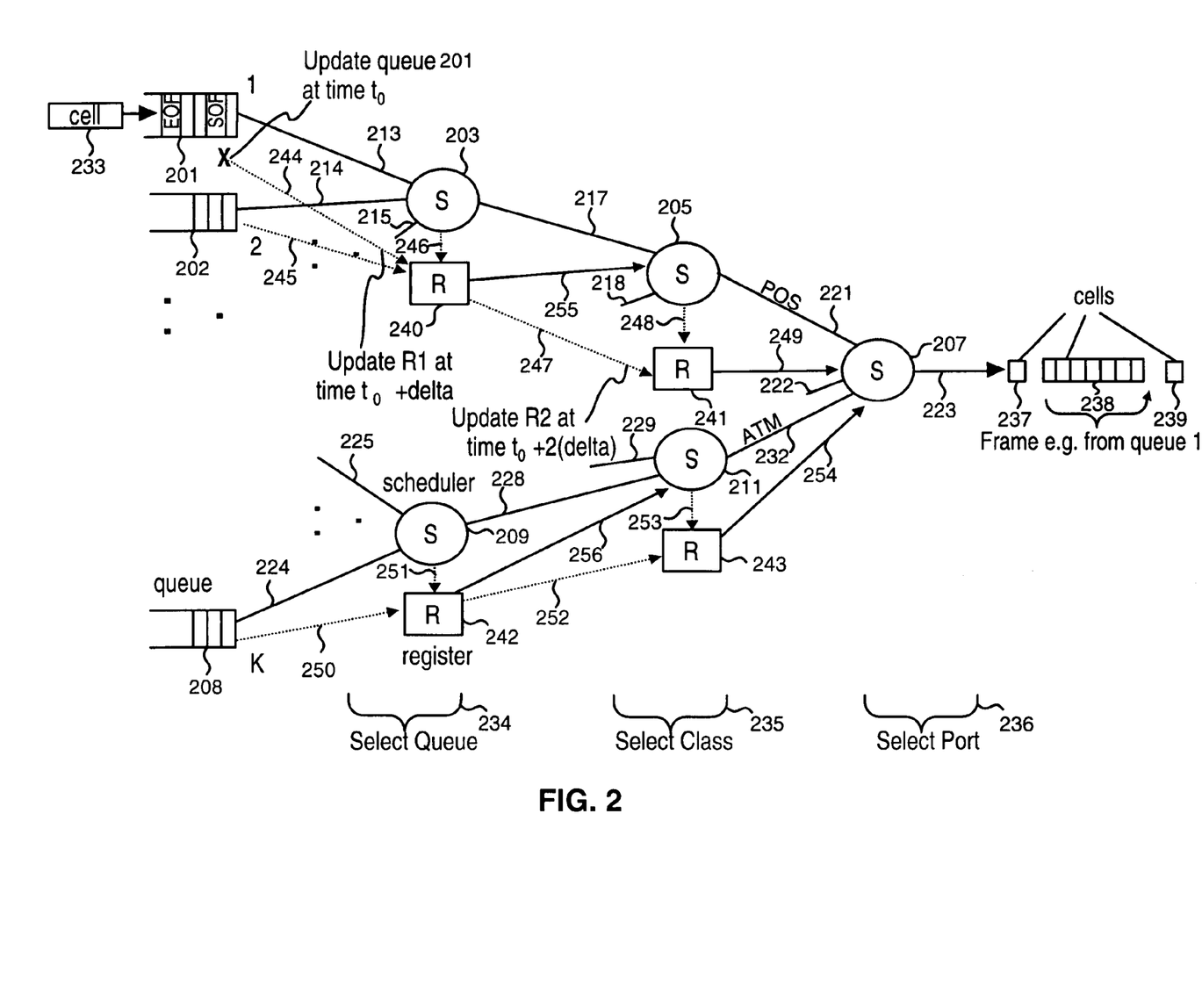
FIG. 2 is a block diagram illustrating a method and apparatus for frame-aware scheduling in a hierarchical arrangement of schedulers in accordance with at least one embodiment of the present invention.

FIG. 2 is a block diagram illustrating a method and apparatus for frame-aware scheduling in a hierarchical arrangement of schedulers in accordance with at least one embodiment of the present invention. The arrangement of such a method or apparatus avoids the disadvantages associated with inter-level queues between levels of the scheduler hierarchy as in the prior art.

In FIG. 2, cell 233 is provided to input queue 201. Input queue 201 includes a cell SOF designating the start of a frame and a cell EOF designating an end of a frame. Input queue 201 is coupled to scheduler 203 via connection 213. Input queue 202 is coupled to scheduler 203 via connection 214. Input queue 201 is associated with register 240 via connection 244. Additional input queues may be coupled to scheduler 203 via connection 215. Input queue 202 is associated with register 240 via connection 245. Scheduler 203 is associated with register 240 via connection 246. Information as to the number of cells in input queues is passed to an associated register. For frame aware queues, the counting of cells is performed for cells of complete frames that are received. So when the EOF is received, the count of cells arrived will increment by the total number of cells in that frame. However, until the EOF is received, the count will not increment for those cells in that frame. For example, information as to the number of cells in input queue 201 is passed to register 240 via connection 244. As another example, information as to the number of cells in input queue 202 is passed to register 240 via connection 245. Scheduler 203 is coupled to scheduler 205 via connection 217. Register 240 is coupled to scheduler 205 via connection 255. Additional information from additional schedulers and registers may be provided to scheduler 205 via connection 218. Register 240 is associated with register 241 via connection 247. Register 240 provides updated information to register 241 via connection 247. Scheduler 205 is associated with register 241 via connection 248. Scheduler 205 is coupled to scheduler 207 via connection 221. Register 241 is associated with scheduler 207 via connection 249.

Input queue 208 is coupled to scheduler 209 via connection 224. Additional queues may be coupled to scheduler 209 via connection 225. Input queue 208 is coupled to register 242 via connection 250. Scheduler 209 is coupled to register 242 via connection 251. Scheduler 209 is coupled to scheduler 211 via connection 228. Register 242 is associated with scheduler 211 via connection 256. Register 242 is associated with register 243 via connection 252. Additional schedulers and registers may be coupled to scheduler 211 via connection 229. Scheduler 211 is associated with register 243 via connection 253. Scheduler 211 is coupled to scheduler 207 via connection 232. Register 243 is associated with scheduler 207 via connection 254. Additional schedulers and registers may be coupled to scheduler 207 via connection 222. Scheduler 207 provides output 223.

As an example of information present at output 223, such information may include cells 237, 238, and 239. The plurality of cells 238 comprises a frame of cells, for example, a frame from input queue 201 including cells delimited by the SOF designation and the EOF designation.

The elements of FIG. 2 may be understood as existing in a plurality of hierarchical levels. For example, the first level of input queues includes input queues 201, 202, and 208. Following this level is a level described as select queue 234. The level select queue 234 includes scheduler 203, register 240, scheduler 209, and register 242. Following this level is a level described as select class 235. The level select class 235 includes scheduler 205, register 241, scheduler 211, and register 243. Following this level is a level described as select port 236. Level select port 235 includes scheduler 207.

Referring to FIG. 2, according to the present invention a hierarchical arrangement of schedulers is provided, but there are preferably no inter-level queues between levels of the scheduler hierarchy as in the prior art. Instead of the inter-level queues, each scheduler, except the last scheduler in the hierarchy, is associated with storage that maintains a value used by its corresponding higher level scheduler to make scheduling decisions. For example, scheduler 203 is associated with the register 240, which is used by scheduler 205 for making scheduling decisions. Likewise, register 241 is associated with the scheduler 205 and is used by scheduler 207 for making scheduling decisions. The value of register 240 is the sum of cells in all input queues that are serviced by scheduler 203. If scheduler 203 is frame aware, then cell counting is performed for all cells that are part of complete frames.

In FIG. 2, solid lines between the input queues and first level of schedulers, and between schedulers in adjacent levels, denote associations that define the hierarchical arrangement of schedulers. That is, scheduler 205, which is serviced by scheduler 207, services scheduler 203. The dotted arrows show how the register's values are updated. For example, register 240 is updated when changes occur in input queues 201 and 202, e.g., with the arrival of new cells, and also with the scheduling of cells by scheduler 203. The solid arrows denote the associations between registers and schedulers for the purpose of making scheduling decisions. For example, scheduler 205 consults register 240, as well as the registers of all other schedulers that it services, to determine if traffic scheduled by scheduler 203 should receive a grant, i.e., to be serviced, or scheduled. Likewise scheduler 207 consults the register 241, and all other registers associated with schedulers that it services, in order to make a scheduling decision.

An operational example will be provided next to further clarify updating of the registers; however, scheduling decision flow will be explained later with reference to FIG. 4. In FIG. 2, a new cell 233 arrives at input queue 201, which is updated with its arrival at time t0. A time t0+delta, register 240 is updated to reflect the change at input queue 201. In the case where the registers simply track the sum of cells in subtending queues, register 240 is incremented by one. The time interval, delta, is a small time delay required by a real-time operating system to propagate the change in input queue 201 to register 240. At time t0+2×delta, register 241 is updated, in this case incremented by one, to reflect the change in register 240. Whenever a scheduler issues a cell grant, i.e., schedules a cell for transmission, the register associated with the scheduler is decremented by one.

Alternatively to the registers associated with the first level of schedulers storing a sum of cells in their corresponding input queues, a sum of ready-to-send (RTS) values can be stored for the purpose of rate limiting the queues. Each RTS value would be the minimum of the queue depth and the allowable burst size (ABS) for the queue. The ABS is the number of cells that can be sent without violating a rate limit set for the queue. The calculation of ABS is based upon service level agreement (SLA) information for the queue. As time passes, the ABS increases up to a maximum value and is decreased as cells are sent. The ABS used may itself be the minimum of two such values in which the rate of increase is different and the maximum value is different. This can be called a "two bucket rate limiter."

This arrangement is described more fully below, for example, in reference to FIG. 4. The present invention uses this arrangement to perform the new method of frame-aware scheduling, but it is not limited to being performed on only this arrangement. The invention also makes use of grants, a known mechanism, issued by a higher level scheduler to a lower level scheduler, or queue, to permit the flow of a unit of traffic therefrom. In this case the unit of traffic is an ATM cell.

The requirement-that a scheduling arrangement must satisfy for the purposes of the invention is as follows: a frame enqueued on a leg (e.g., connection at an input of a scheduler) of a lower-level scheduler must not prevent a higher-level scheduler, by reason of the structure of the arrangement, from selecting another lower-level scheduler. In the prior art arrangement depicted in FIG. 1, the inter-level queues prevent the arrangement from meeting this requirement. For example in FIG. 1, once scheduler 103 selects a queue 101 to provide a frame for inter-level queue 104, queue 102 cannot provide a frame for the port until the frame from queue 101 has been serviced.

In the present solution, as illustrated in FIG. 2, each queue collects frames; however, scheduler 203 does not select a queue to service until it itself has been selected by scheduler 205, which does not happen until scheduler 205 has been selected by scheduler 207. As queues collect frames, each scheduler along the legs that the queues are on is updated with the size of the selected frames. Consequently, the elements of the several stages are aware of how much data is available down their respective legs and hence how many grants may be accepted before all frames are sent.

Figure 3:
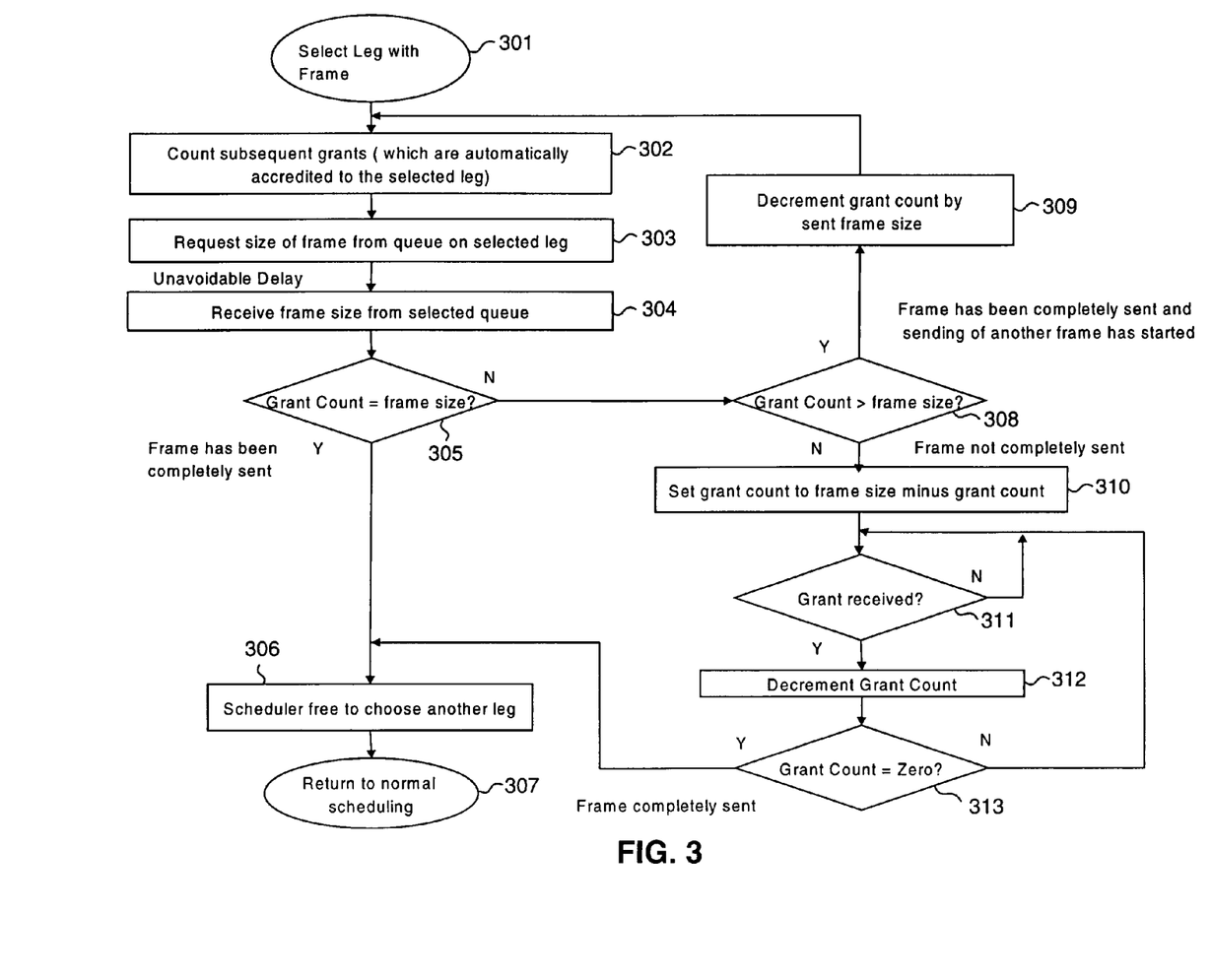
FIG. 3 is a flow diagram illustrating a method for frame-aware scheduling in a hierarchical arrangement of schedulers in accordance with at least one embodiment of the present invention.

FIG. 3 is a flow diagram illustrating a method for frame-aware scheduling in a hierarchical arrangement of schedulers in accordance with at least one embodiment of the present invention. Due to the latency between the selection of the actual queue to service and the determination of the size of the frame at the head of that queue, significant new functionality is provided to support the frame-aware nature. Such functionality may be implemented by configuring the method to occur such that once a frame has started to be serviced, it will be serviced to completion before another queue (with another frame in it) can be selected. Without such new functionality, the latency mentioned above can result in a service decision being made based on the assumption that a frame is in the process of being sent, when in fact the frame has already been completely sent and a new frame is being sent.

Such new functionality is described in more detail with reference to FIG. 3, in which the method starts when a frame aware scheduler selects a leg from which to service a new frame at step 301. After a leg is selected, the sending of data units of a frame from the head of a queue may begin. The method continues to step 302, where subsequent grants are counted. Such subsequent grants are automatically accredited to the selected leg. In step 303, the size of a frame is from a queue on the selected leg is requested. Following step 303 there is an unavoidable delay incurred while obtaining the requested frame size prior to step 304. At step 304, a frame size is received from the selected queue. In step 305, a decision is made as to whether the grant count is equal to the frame size. If the grant count is found to be equal to the frame size in step 305, then the frame has been completely sent and the process continues to step 306. In step 306, the scheduler is free to choose another leg. In step 307, the scheduler returns to normal scheduling.

If, however, in step 305, the grant count is found not to be equal to the frame size, the process continues in step 308. In step 308, a determination is made as to whether or not the grant size is greater than the frame size. If the grant size is greater than the frame size, the frame has been completely sent and the sending of another frame has started. In such a case, the process continues to step 309 where the grant count is decremented by the sent frame size. From step 309, the process returns to step 302.

If, however, in step 308, a determination is made that the grant size is not greater than the frame size, then it is determined that the frame has not been completely sent, and the process continues to step 310. In step 310, the grant count is set to the frame size minus the grant count. In step 311, a determination is made as to whether or not a grant has been received. If no grant has been received, the process remains at step 311. However, if a grant has been received, the process continues to step 312, where the grant count is decremented. From step 312, the process continues to step 313, where a determination is made as to whether or not the grant count is equal to zero. If the grant count is not equal to zero, the process returns to step 311. However, if the grant count is equal to zero, the process proceeds to step 306.

It should be noted at this point that the scheduling structure does not need to be entirely frame aware. A frame aware scheduler has frame aware schedulers or queues as its legs, but it may itself be scheduled on a non-frame aware scheduler.

After selecting a leg from which to service a new frame, each subsequent grant will automatically go to the same leg and a count will be kept of the number of grants sent that way. After some delay, the size of the frame at the head of the queue selected for service will be returned. If the size is greater than the count, then the frame has not been completely sent. The count is updated to the number of grants left to complete the frame and until the frame is complete, each grant will result in count being decremented, when it equals zero, the frame is complete and the scheduler can freely chose the next leg to receive the next grant. If size equals the count then the frame has been completely sent (and no more). The scheduler can freely choose the next leg to receive the next grant. If size is less than the count then the entire frame has been sent and the next frame has started to be sent. The count is decremented by the size (however, a count of the total number of grants is maintained as part of the decision making process of the scheduler), the decision of the leg to service remains fixed and the wait for the size of the frame currently being serviced begins.

At least one embodiment of the present invention is useful and beneficial in that it enables implementation of frame-aware scheduling on multi-service platforms without sacrificing responsiveness to high priority traffic. At least one embodiment of the present invention is useful and beneficial in that it enables frame-aware scheduling at higher port speeds by lowering average scheduling decision times.

Due to the latency to retrieve the size of a frame being serviced and the requirement to completely service any frame started, if a frame aware scheduler continuously services very short frames, the queue selection may remain fixed for a period of time. Provided that such a condition does not continue indefinitely, fairness is not impaired by it.

Frame-based services, e.g. packet over SONET (POS), are particularly useful, especially at high port speeds. Embodiments of the present invention provide the capability to schedule such traffic in an efficient manner without sacrificing responsiveness to higher priority traffic. Therefore, embodiments of the invention may be used to increase the usefulness of switching/routing platforms.

The scheduling arrangement would normally be implemented in hardware, typically as an integrated circuit. However, in accordance with at least one embodiment of the present invention, the scheduling arrangement may be practiced using any suitable combination of hardware and/or software. For example, the scheduling arrangement may be implemented using one or more integrated circuits, such as custom integrated circuits, application-specific integrated circuits (ASIC's), field-programmable gate arrays (FPGA's), other programmable logic devices (PLD's), or other processing devices, such as a processing device provided with memory. Such a processing device may include a single processing device or a plurality of processing devices, which may, for example, be microprocessors, microcomputers, microcontrollers, digital signal processors, central processing units (CPU's), state machines, and/or any device that manipulates data based on operating and/or programming instructions. Memory may be a single memory device or a plurality of memory devices, which may include system memory, local memory, random access memory, read only memory, hard disk memory, magnetic tape memory, and/or any device that stores data, and such memory may be integrated with one or more processing devices or may be implemented separately.

Figure 4:
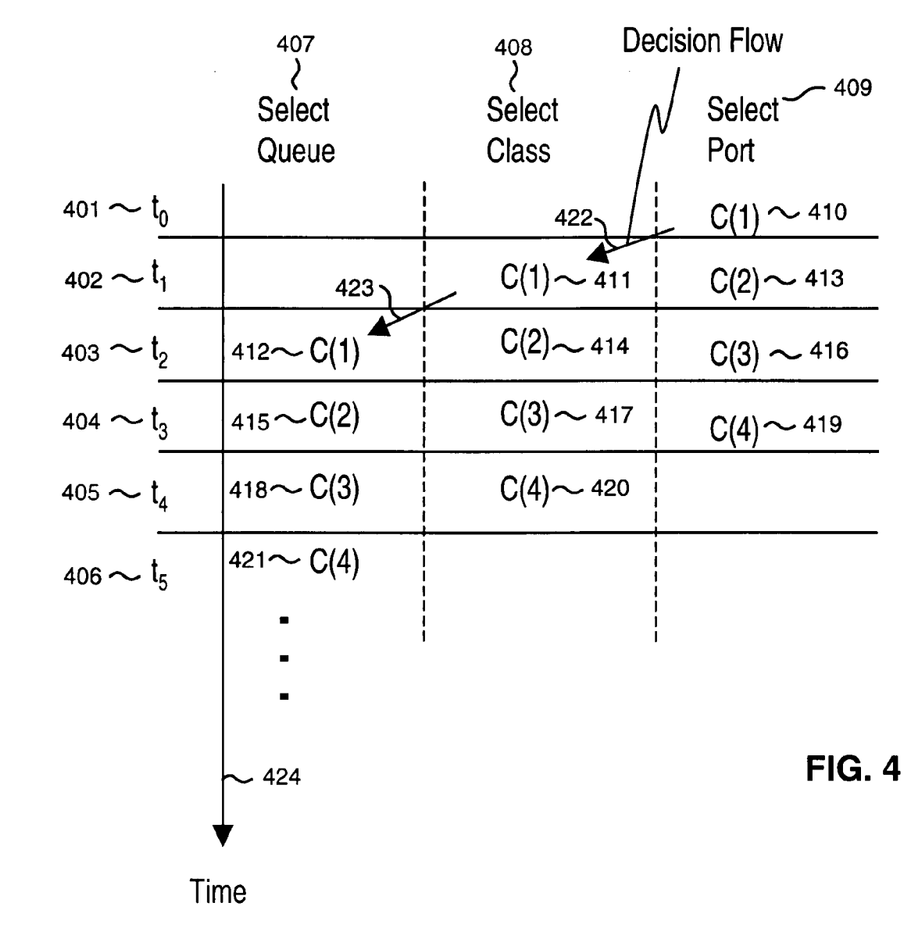
FIG. 4 is a diagram illustrating a pipelined decision flow of scheduling decisions in accordance with at least one embodiment of the present invention.

FIG. 4 is a diagram illustrating a pipelined decision flow of scheduling decisions in accordance with at least one embodiment of the present invention. In this figure, time is represented along axis 424, while scheduler levels are represented or orthogonal to axis 424, for example as level select queue 407, select class 408, and select port 409. Examples of discrete intervals of time include time $T_0$ 401, time $T_1$ 402, time $T_2$ 403, time $T_3$ 404, time $T_4$ 405, and time $T_5$ 406. Sets of scheduling decisions are illustrated to form a two-dimensional matrix. For example, a first set of scheduling decisions C(1) 410 occurs at time $T_0$ 401 at level select port 409. The first set of scheduling decisions C(1) 410 follows decision flow path 422 to level select class 408 at time $T_1$ 402, and appears at scheduling decision set C(1) 411. This scheduling decision set follows decision flow path 423 to arrive at scheduling decision set C(1) 412 at level select queue 407 at time $T_2$ 403. Likewise, scheduling decision set C(2) 413, which is found at level select port 409 during time $T_1$ 402, proceeds along a decision flow path to scheduling decision set C(2) 414 at level select class 408 during time $T_2$ 403. This scheduling decision set proceeds along a decision flow path to scheduling decision set C(2) 415, which occurs at level select queue 407 during time $T_3$ 404.

Also, scheduling decision set C(3) 416, which is present at level select port 409 during time $T_2$ 403, proceeds along a decision flow path to select class 408 at time $T_3$ 404, as indicated by scheduling decision set C(3) 417. Scheduling decision set C(3) 417 continues along a decision flow path to scheduling decision set C(3) 418 at level select queue 407 and time interval $T_4$ 405. As yet another example, scheduling decision set C(4) 419, which occurs at level select port 409 during time $T_3$ 404, progresses along a decision flow path to scheduling decision set C(4) 420 at level select class 408 during time $T_4$ 405. Scheduling decision set C(4) 402 progresses along a decision flow path to scheduling decision set C (4) 421, which occurs at level select queue 407 during time $T_5$ 406.

The occurrences of scheduling decisions depict pipelined decision flow. In FIG. 4, time is depicted as cell time slots, e.g. $t_0$ to $t_5$, incrementing with downward movement along the vertical axis. Scheduler levels are displayed horizontally and in the same order, from right to left, as in FIG. 2. Sets of scheduling decisions are denoted as C(n), where the value of n identifies a particular decision set. The arrows show decision flow. For example, at time $T_0$ 401, the port for decision set C(1) 410 is selected. Then at times $t_1$ 402 and $t_2$ 403, the class and queues for the set C(1) 411 and 412 are selected, respectively. Also, at time $t_1$ 402, another decision set C(2) 413 is initiated by selecting a port for the set. Furthermore, at time $t_2$ 403, the class for the decision set C(2) 414 is selected, and another decision set C(3) 416 is initiated by selecting a port for it. In this way, when the pipeline is full, a decision set is completed and a new decision set may be initiated at each cell time.

Since the scheduling decision flow occurs in a reverse direction, i.e. with an output port being selected first and the input queue being selected last, and because the registers are updated in real-time, the scheduling arrangement can respond almost immediately to changes occurring at the input queues. In this case almost immediately is within one cell time slot. For example, if a high priority cell were to arrive at input queue 201 at time $t_1$ 402, register 240 would be updated at time $t_1$+delta, which allows scheduler 203 to select input queue 201 as part of decision set C(1) 412 at time $t_2$ 403. In this way, low priority cells arriving first are prevented from taking precedence over later arriving high priority cells.

Such a scheduling arrangement may be configured to be advantageous in any or all of several ways. For example, such a scheduling arrangement allows multiple scheduling levels to be supported, and even more added, while providing a constant scheduling decision response time that is in the order of one cell time slot. Therefore, new service priorities/classes can be added to those supported without affecting scheduling performance of the switch/router.

Furthermore, such a scheduling arrangement can overcome the aforementioned problem of arrival priority taking precedence over assigned priority. Additionally, such a scheduling arrangement allows for easy implementation of rate shaping, i.e. by storing sums of RTS values in the registers instead of sums of cells.

As differentiated services and QoS/CoS capabilities become more important in networks, both to increase network revenues through greater service segregation and to support new services, switches/routers that can effectively provide these capabilities will become increasingly more valuable. The methods and apparatuses described herein can provide this important capability in switching/routing platforms. Furthermore, such methods and apparatuses may be used to implement a switch/router that provides response to priorities of cells/packets within one cell time.

Figure 5:
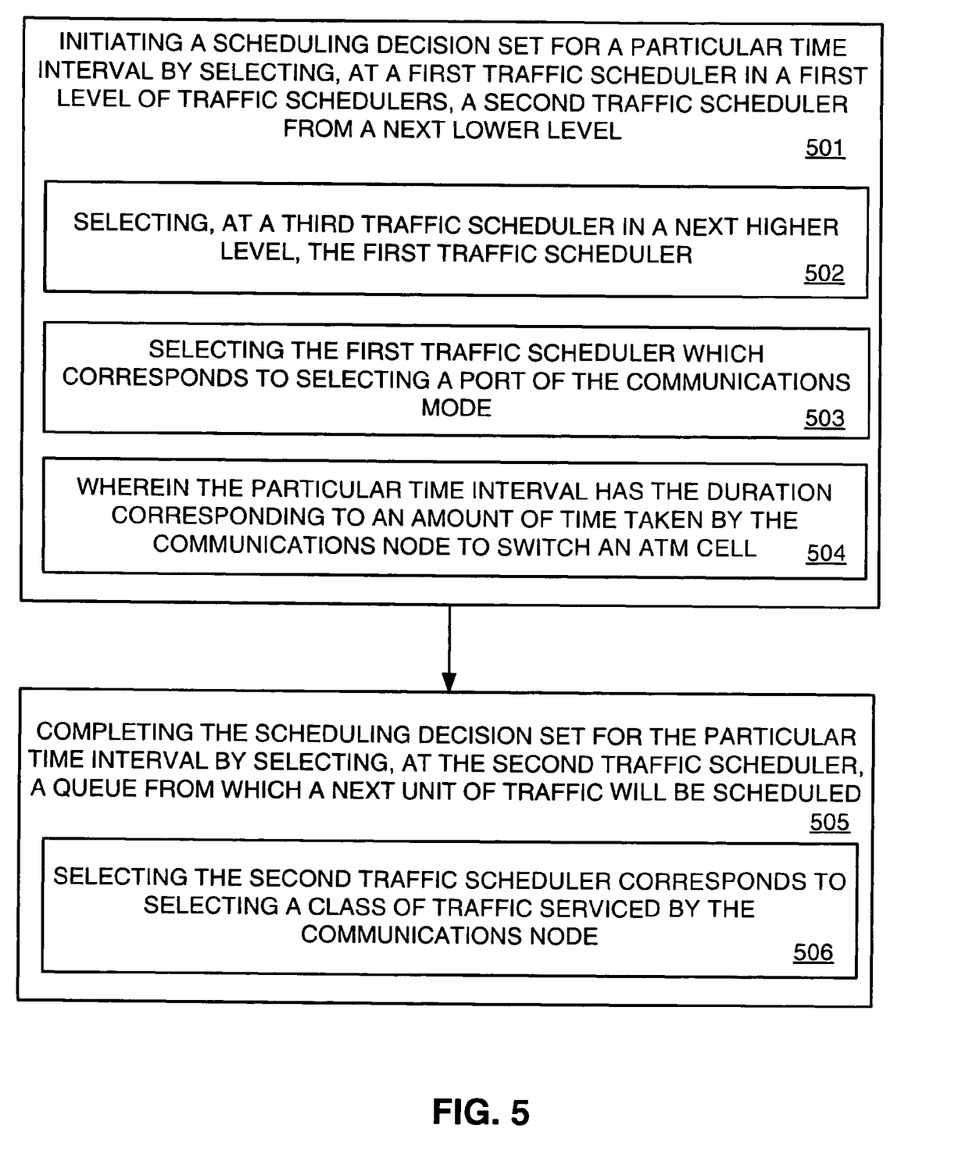
FIG. 5 is a flow diagram illustrating a method in accordance with at least one embodiment of the present invention.

FIG. 5 is a flow diagram illustrating a method in accordance with at least one embodiment of the present invention. In step 501, a scheduling decision set is initiated for a particular time interval by selecting, at a first traffic scheduler in a first level of traffic schedule list, a second traffic scheduler from a next lower level. Step 501 may include steps 502, 503, and/or 504. In step 502, the first traffic scheduler is selected at a third traffic scheduler in a next higher level. In step 503, the first traffic scheduler is selected which corresponds to selecting a port of the communications node. In step 504, the particular time interval had the duration corresponding to an amount of time taken by the communication node to switch an ATM cell. In step 505, the scheduling decision set is completed for the particular time interval by selecting, and a second traffic schedule, a queue from which the next unit of traffic will be scheduled. Step 505 may include step 506. In step 506, a second traffic scheduler corresponding to selecting a class of traffic service by the communications node is selected.

Thus, a method and apparatus for frame-aware and pipelined hierarchical scheduling has been presented. Although the invention has been described using certain specific examples, it will be apparent to those skilled in the art that the invention is not limited to these few examples. Other embodiments utilizing the inventive features of the invention will be apparent to those skilled in the art, and are encompassed herein.

What is claimed is:

1. A method for scheduling frames comprised of data units in a communications node, the communications node having a plurality of queues for storing the data units and a hierarchical arrangement of schedulers for scheduling the frames, the method comprising the steps of:
    selecting, at a particular scheduler in the hierarchical arrangement, a queue from which a frame of the frames may be sent and accrediting any subsequently received grants at the particular scheduler to the queue;
    starting the sending of the data units of the frame from a head of the queue;
    determining the size of the frame at the head of the queue;
    determining, at the particular scheduler, a value equal to a count of the grants issued for the queue minus a size of the frame; and
    selecting, at the particular scheduler, another queue from which additional ones of the data units may be sent responsive to the value being zero.

2. The method of claim 1 further comprising the steps of:
    setting the count of the grants equal to the value; and
    repeating the steps of claim 1 responsive to the value being greater than zero.

3. The method of claim 2, further comprising the steps of, responsive to the value being less than zero:
    setting the count of the grants equal to the size of the frame minus the count of the grants;
    decrementing the count of the grants with each new grant of the subsequently received grants accredited to the queue; and
    selecting, at the particular scheduler, the another queue from which data units may be sent responsive to the value being zero.

4. The method of claim 3 wherein the step of selecting the queue is performed recursively for the schedulers at different levels of the hierarchical arrangement.

5. The method of claim 3 wherein the step of selecting the queue is performed iteratively for the schedulers across different levels of the hierarchical arrangement.

6. The method of claim 3 further comprises the steps of:
    selecting, at a particular port selection scheduler of the schedulers, a port of the communications node to which the data units will be outputted; and
    selecting, at a particular class selection scheduler, a class within which the data units will be prioritized.

7. An arrangement of schedulers for scheduling traffic in a communications node having a plurality of queues, each queue of the plurality of queues for storing a portion of the traffic in units of the traffic, the arrangement of schedulers comprising:
    a plurality of the schedulers of which each scheduler of the plurality of the schedulers is for scheduling the traffic directly from a unique portion of the queues and is associated with a respective register of a plurality of registers for storing information corresponding to an aspect of the respective unique portion of the queues;
    a plurality of intermediate schedulers of which each intermediate scheduler of the plurality of intermediate schedulers is for scheduling the traffic from a unique portion of the plurality of schedulers and is associated with a respective intermediate register for storing a number corresponding to an aspect of the respective unique portion of the schedulers; and
    an output scheduler being operable to schedule the traffic from the plurality of schedulers in dependence upon the information stored in the plurality of registers, wherein the output scheduler is further operable to schedule the traffic from the plurality of intermediate schedulers in dependence upon the number stored in the respective intermediate register.

8. The arrangement of claim 7 wherein the information comprises a summation of the units of the traffic in the unique portion of the queues.

9. The arrangement of claim 7 wherein the information comprises a summation, over the unique portion of the queues, of a minimum of the units of the traffic in each of the queues of the unique portion of the queues and an allowable burst size denominated in the units of the traffic of each of the queues of the portion of the queues.

10. The arrangement of claim 9 wherein the number reflects a summation of the information stored in each of the registers associated with the plurality of the schedulers.

11. The arrangement of claim 10 wherein the units of the traffic are asynchronous transfer mode (ATM) cells.

12. A method for scheduling traffic in a communications node having a plurality of queues for storing units of traffic to be scheduled and a hierarchical arrangement of levels of traffic schedulers, comprising the steps of:
    initiating a scheduling decision set for a particular time interval by selecting, at a first traffic scheduler of the traffic schedulers in a first level of the levels, a second traffic scheduler of the traffic schedulers from a next lower level of the levels, wherein selecting the second traffic scheduler corresponds to selecting a class of the traffic serviced by the communications node, wherein the step of initiating further comprises first selecting, at a third traffic scheduler of the traffic schedulers in a next higher level of the levels, the first traffic; and completing the scheduling decision set for the particular time interval by selecting, at the second traffic scheduler, a queue from which a next unit of the traffic will be scheduled.

13. The method of claim 12, wherein selecting the first traffic scheduler corresponds to selecting a port of the communications node.

14. The method of claim 13 wherein the units of the traffic are asynchronous transfer mode (ATM) cells.

15. The method of claim 14 wherein the particular time interval has a duration corresponding to an amount of time taken by the communications node to switch an ATM cell of the ATM cells.

* * * * *